Dec. 13, 1966     T. M. BRITTON, JR     3,291,423
SELF-COMPENSATING POWER-SPREAD PARACHUTE APPARATUS
Filed March 15, 1965     4 Sheets-Sheet 1
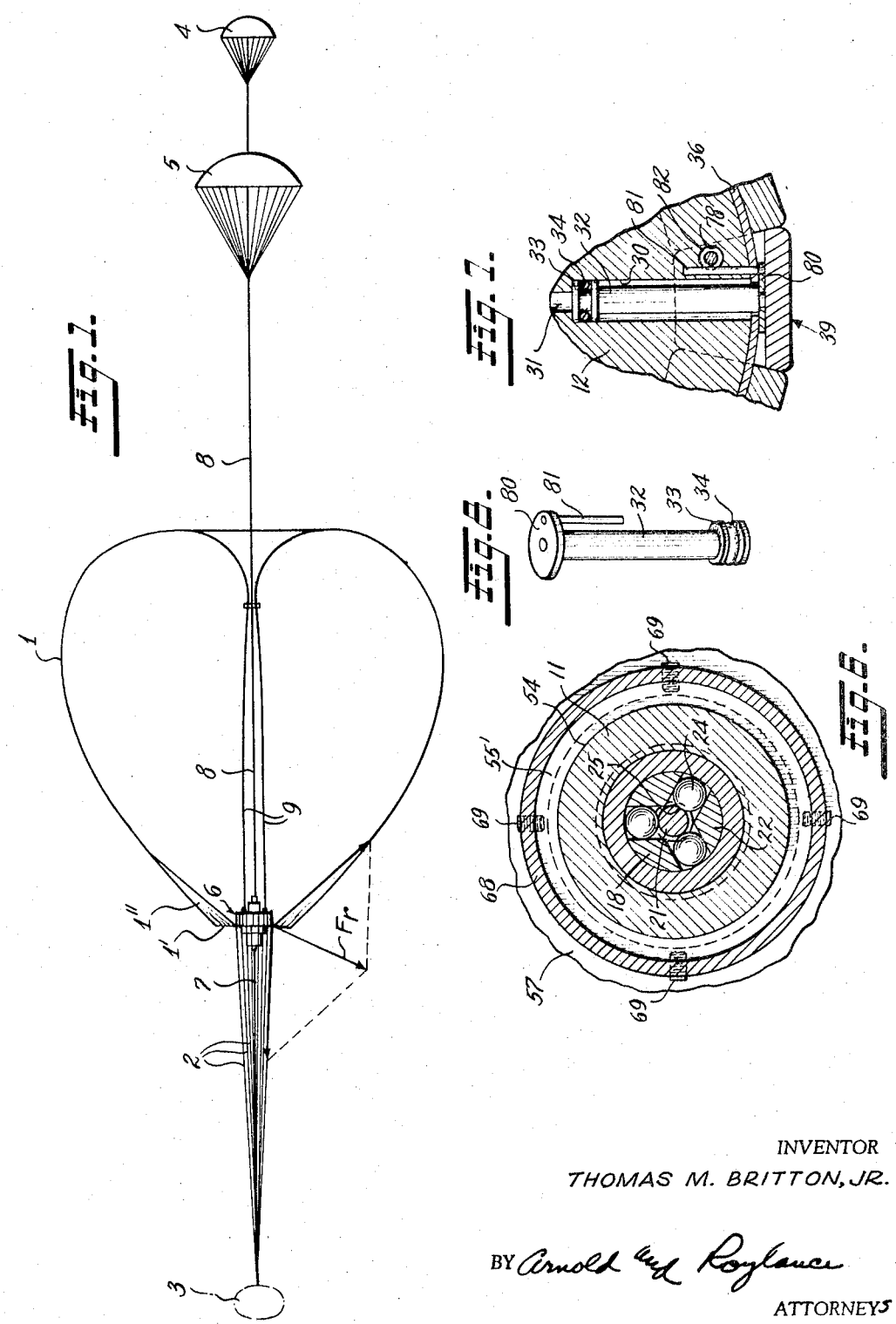
INVENTOR
THOMAS M. BRITTON, JR.
BY   *Arnold and Roylance*
ATTORNEYS

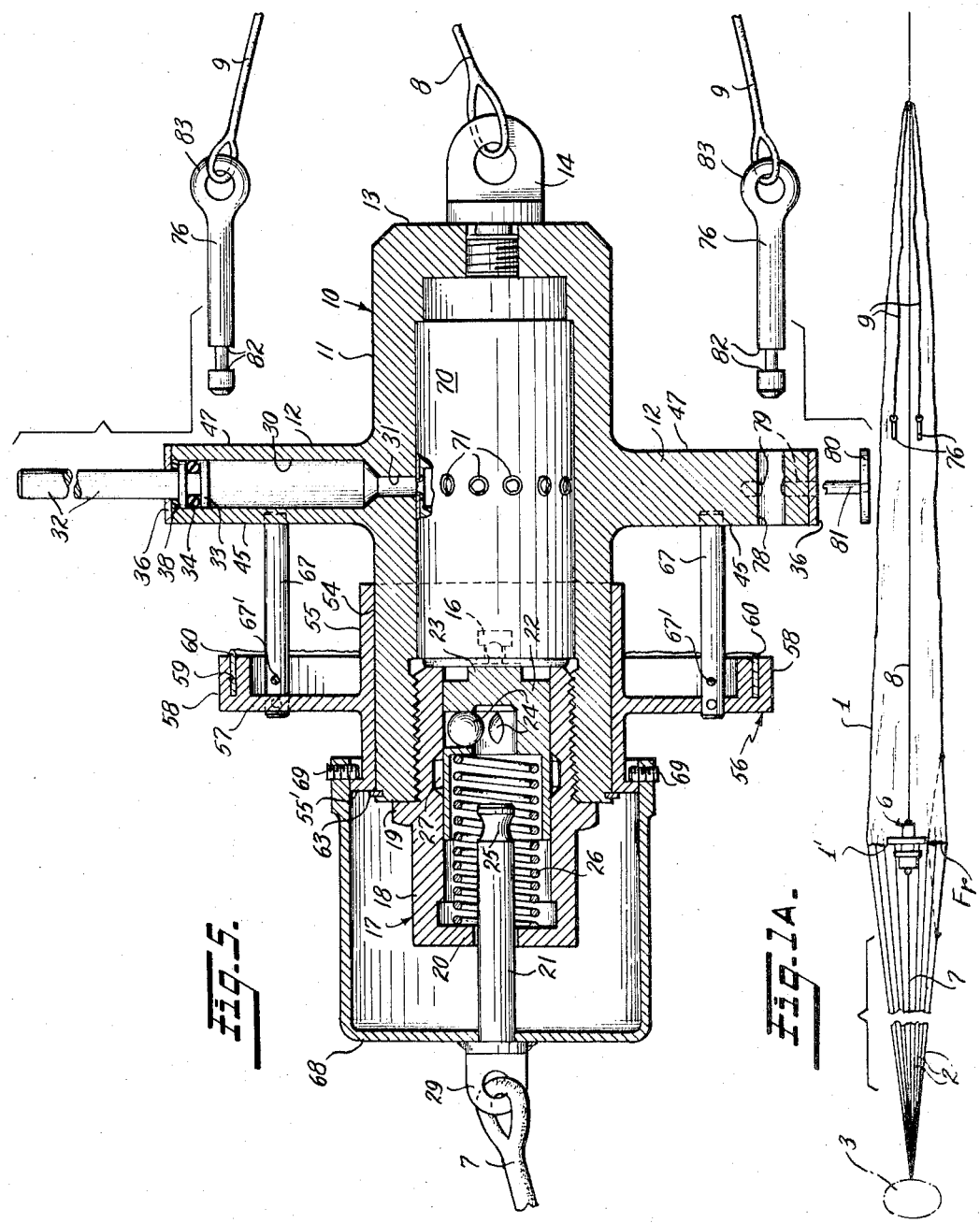

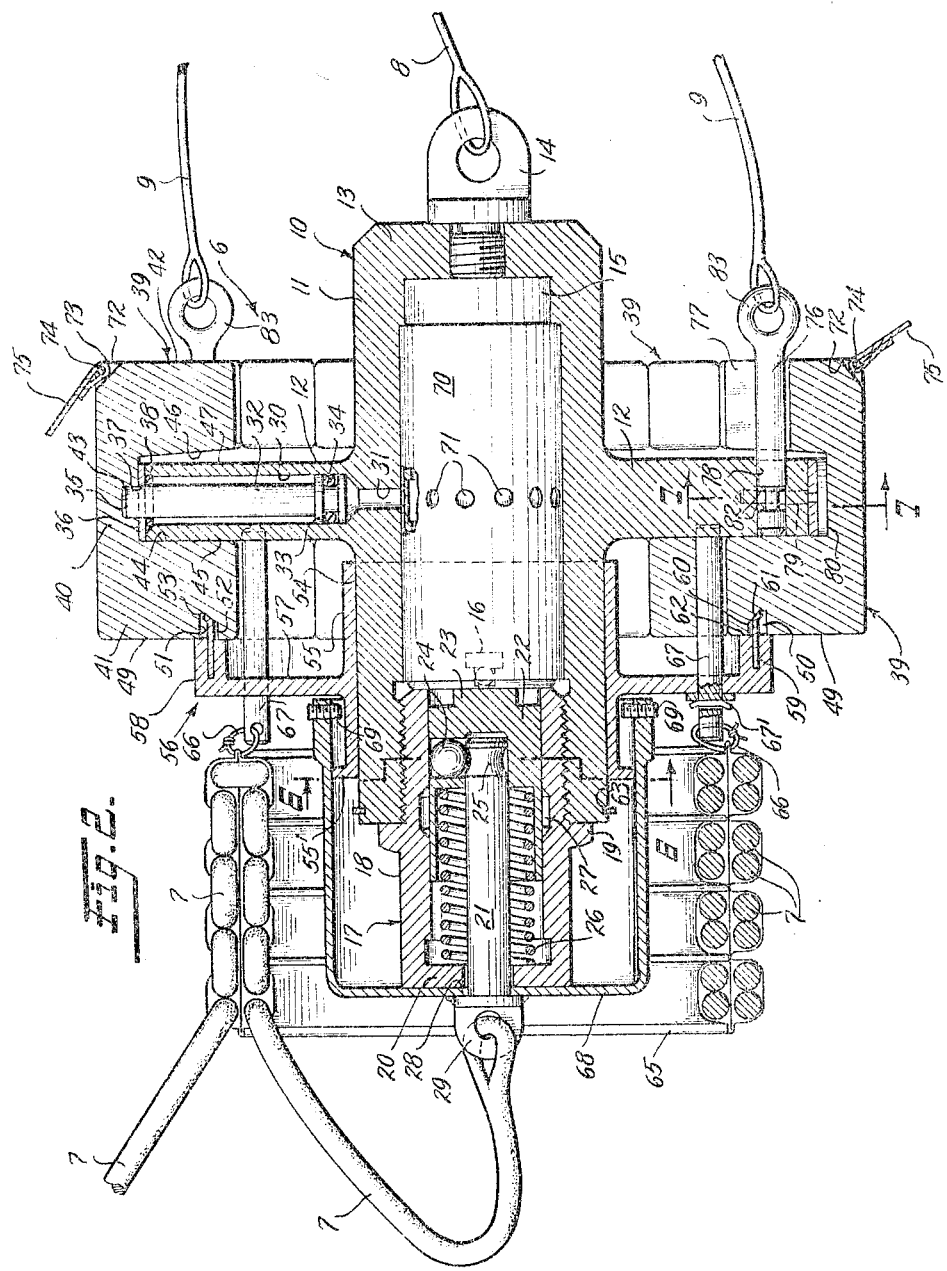

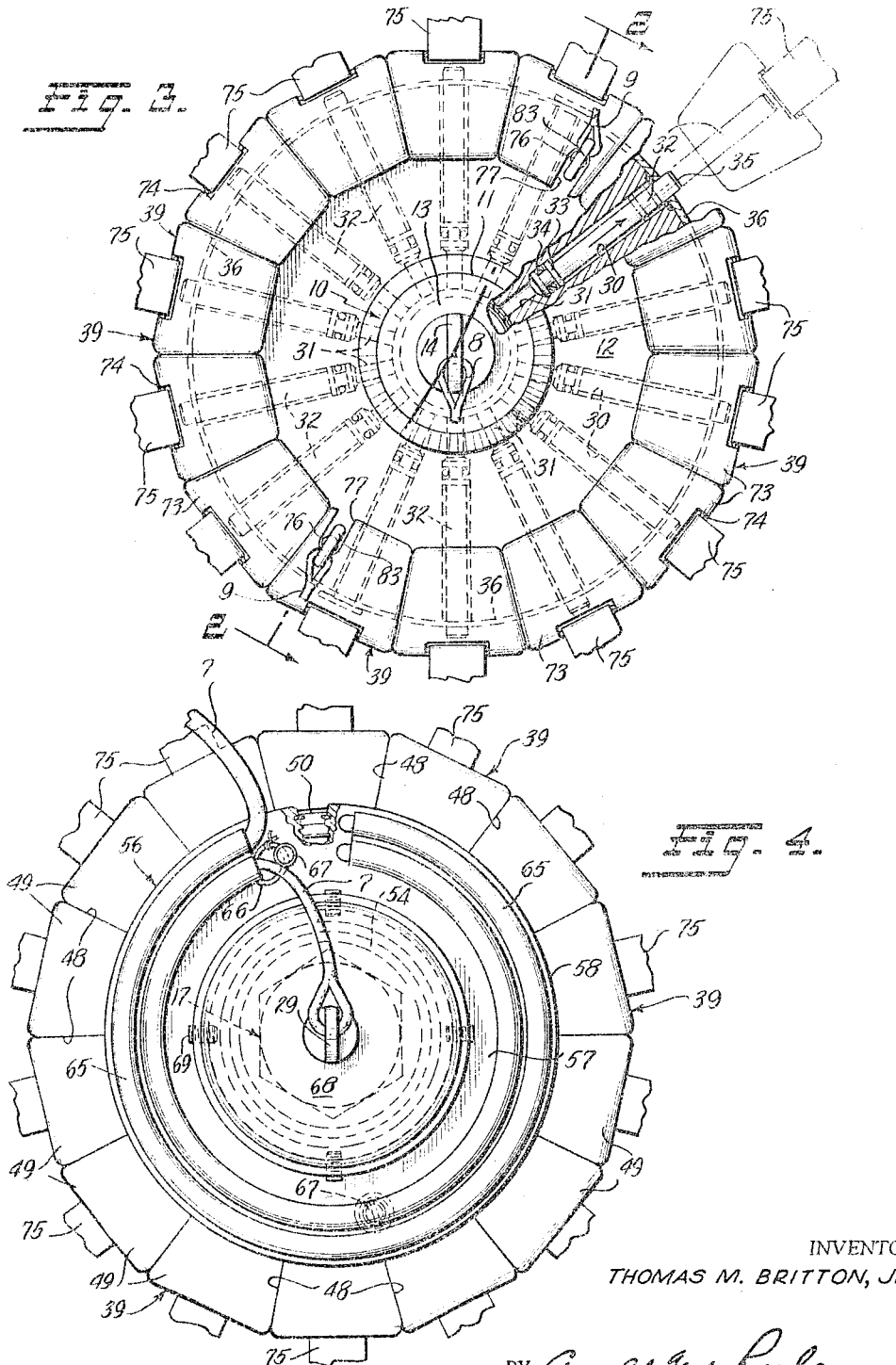

United States Patent Office 3,291,423
Patented Dec. 13, 1966

3,291,423
SELF-COMPENSATING POWER-SPREAD
PARACHUTE APPARATUS
Thomas M. Britton, Jr., Asheville, N.C., assignor to
Stencel Aero Engineering Corporation, Asheville, N.C.,
a corporation of North Carolina
Filed Mar. 15, 1965, Ser. No. 439,569
6 Claims. (Cl. 244—149)

This invention relates to parachute apparatus and, more particularly, to parachute apparatus which is self-compensating for satisfactory operation under conditions of both low relative air speed and high relative air speed.

Parachute apparatus have been developed in recent years which employ a ballistic device for accomplishing a positive, very rapid spreading of the parachute canopy. An explosively operated ballistic device is usually employed, and the art has developed to a state such that full spreading of the canopy can be accomplished in times as short as a fraction of a second. Such parachute apparatus are useful, for example, in the recovery of a person initially occupying an ejection seat, in which case it must be recognized that the seat may be ejected under any of a number of widely differing circumstances, ranging from the very low air speeds encountered when the aircraft is maneuvering on the ground to relatively high air speeds encountered during flight. At low relative air speeds, it is necessary to spread the parachute canopy fully in the shortest possible time, and a fast-acting ballistic spreading device, such as an explosively operated gun, is admirably suited for this purpose. At high air speeds, however, very quick spreading of the canopy would result in an unduly large snatch force which tend to damage both the canopy and the load being recovered. Though ballistically spread parachute apparatus adapted for operation at both low and high relative air speeds have heretofore been proposed, as disclosed for example in United States Patent 3,010,685, issued November 28, 1961, to Fred B. Stencel, there is a continuing need for improved apparatus having such capabilities.

A general object of the invention is accordingly to devise a parachute apparatus embodying a ballistic spreading device and which is self-compensating for successful operation at both low relative air speeds and high relative air speeds.

Another object is to provide such an apparatus in which the combination of the canopy and the ballistic spreading device need not be equipped with auxiliary elements arranged to directly restrain the ballistic spreading device when the canopy is deployed under high air speed conditions.

A further object is to provide such a parachute apparatus wherein the ballistic spreading device is damped automatically under high speed conditions with this action being achieved without use of expensive or complicated equipment.

Stated broadly, parachute apparatus embodying the invention employ a ballistic spreading device arranged to accomplish quick spreading if the action of the spreading device is not opposed, and at least one "anti-squidding" line initially connecting the spreading device to the apex or an equivalent point on the canopy, the arrangement being such that the anti-squidding line is released from the ballistic spreading device automatically when the ballistic spreading device is actuated, the canopy thus being freed to stream out completely with the result that, under high air speed conditions, streaming of the canopy produces a force which opposes or damps the action of the ballistic spreading device.

In order that the manner in which the foregoing and other objects are achieved in accordance with the invention can be understood in detail, a parachute apparatus in accordance with one particularly advantageous embodiment of the invention will be described with reference to the accompanying drawings, which form a part of this specification, and wherein:

FIG. 1 is a semi-diagrammatic illustration of the parachute apparatus with the drogue canopies deployed and spread and the main canopy deployed but held in partially inflated condition under restraint of the anti-squidding lines;

FIG. 1A is a view similar to FIG. 1 but showing the main canopy fully streamed out;

FIG. 2 is a longitudinal sectional view, taken on line 2—2, FIG. 3, of the canopy spreading gun employed in the parachute apparatus of FIG. 1;

FIG. 3 is an end elevational view of the spreading gun of FIG. 2, FIG. 3 being taken from the right-hand end as the gun is seen in FIG. 2;

FIG. 4 is an end elevational view similar to FIG. 3 but taken from the other end of the gun;

FIG. 5 is a longitudinal sectional view similar to FIG. 2 but showing parts of the control means for the gun in positions occupied immediately after firing;

FIG. 6 is a transverse fragmentary sectional view taken on line 6—6, FIG. 2;

FIG. 7 is a fragmentary sectional view taken on line 7—7, FIG. 2; and

FIG. 8 is a perspective view of one of the projectile-driving pistons employed in the gun of FIG. 2 and equipped with an anti-squidding line retaining pin.

Turning now to the drawings in detail, the invention is shown in FIG. 1 as applied to a parachute apparatus comprising a main parachute canopy 1, suspension lines 2 connected to the periphery or skirt of canopy 1 and extending to the load 3, the suspension lines being connected to the load in any conventional fashion, a smaller drogue canopy 4, and a larger drogue parachute 5. A ballistic spreading gun, indicated generally at 6, is employed as described hereinafter in detail, the spreading gun being connected to load 3 via a firing lanyard 7 which is significantly shorter than suspension lines 2. The spreading gun is also connected to the larger drogue canopy 5 by a drogue line 8 which extends freely through an opening in the apex of main canopy 1. The smaller drogue canopy 4 is connected to the apex of drogue canopy 5 and also to line 8 so that, assuming adequate relative air speed, the action of the two drogue canopies is to render the combination of lines 7 and 8 fully taut against resistance of the load, so that, if desired, firing of the spreading gun is accomplished automatically when the action of drogue canopy 5 has rendered lines 7 and 8 initially taut.

The spreading gun 6 is also initially connected to the apex of canopy 1 via two "anti-squidding" lines 9 which are markedly shorter than the distance over which the canopy 1 would stream prior to spreading if the lines 9 were not present. The effect of lines 9 is to prevent the canopy 1 from fully streaming to "squidded" condition immediately after extraction of the canopy from its pack. Lines 9 restrain the apex of the canopy, so that the canopy assumes the belled out semi-inflated configuration illustrated in FIG. 1, spaced points on the skirt 1' being restrained against outward movement by reason of their attachment to the projectiles of the gun. As shown by the vector diagram in FIG. 1, this action of lines 9 causes the relative angular dispositions of the peripheral portion of canopy 1 and the attached suspension lines 2, prior to operation of spreading gun 6, to be such that the resultant $F_r$ is in a direction tending to spread the canopy. Thus, so long as they remain connected between the spreading gun and the apex of canopy 1, the anti-squidding lines 9 have the ultimate effect of aiding the action of the spreading gun.

If gun 6 is fired to commence spreading the canopy 1, and lines 9 are released, canopy 1 then is streamed out toward the configuration seen in FIG. 1A, the resultant $F_r$ then being directed inwardly to oppose the spreading forces generated by the gun.

Turning now to FIGS. 2–8, the spreading gun 6 includes an integral housing 10 having a cylindrical central body portion 11 and a flat transverse annular outwardly projecting flange 12 located between the ends of body portion 11. At one end, body portion 11 has an end wall 13 provided with a threaded central bore into which is threaded an eye-bolt 14 to which the drogue line 8 is secured. Body portion 11 defines a generally cylindrical interior cavity extending from end wall 13 throughout the length of portion 11 and having an open, interiorly threaded end portion opposite end wall 13. This interior cavity accommodates an explosive charge 15 of conventional form, which serves as the power means for the spreading gun, and a conventional impact operated primer 16.

As a means for actuating the spreading gun, there is provided an initiator indicated generally at 17 and including a casing 18 having an exteriorly threaded end portion engaged in the interiorly threaded end portion of the cylindrical cavity defined by body portion 11, the axial position of initiator 17 being fixed by engagement of an exterior flange 19 on casing 18 with the adjacent end face of body portion 11. At its outer end, casing 18 has a transverse end wall 20 with a central aperture through which a firing pin 21 slidably extends. A striker 22 slidably embraces the inner end portion of firing pin 21 and is in turn slidably embraced by the cylindrical wall of casing 18, the tip 23 of the striker being aligned with primer 16. Striker 22 has a plurality of radially extending cylindrical bores each accommodating a rigid ball 24. Initially, balls 24 engage a plain portion of the cylindrical inner wall of casing 18 and are thus held in engagement in a transverse annular groove 25 provided in the portion of firing pin 21 which is embraced by the striker. A helical compression spring 26 surrounds the firing pin and is engaged between end wall 20 and striker 22 so as to urge the striker toward primer 16. In a location spaced from the initial position of the striker toward end wall 20, the inner wall of casing 18 is provided with a transverse annular inwardly opening groove 27.

The outer end portion of firing pin 21 is transversely enlarged, providing a portion 28 which is secured rigidly to the transverse end wall of a cup-shaped member 68, described hereinafter. The outer end portion of the firing pin includes a ring 29 to which the firing lanyard 7 is secured. With balls 24 held engaged in groove 25 because of their engagement with the surrounding portion of casing 18, spring 26 biases the firing pin toward the primer and holds shoulders 28 in engagement with the wall 20. Because of this engagement, the firing pin is locked out of contact with the primer. However, when a strain is applied to firing lanyard 7, firing pin 21 can be considered as being moved to the left, as viewed, compressing spring 26 and causing balls 24 to come into engagement in groove 27. Since engagement of balls 24 in groove 27 allows outward movement of the balls, they disengage from groove 25, freeing the firing pin from striker 22, withdrawal of the firing pin then continuing. Striker 22 is now accelerated to the right, as viewed, by the action of spring 26, so that the tip 23 impacts on the primer 16, exploding the primer and causing ignition of charge 15.

Flange 12 is provided with a plurality of radially directed bores 30 each communicating via a port 31 with the portion of the internal cavity of body portion 11 occupied by charge 15. Each bore 30 presents a smooth, continuous, cylindrical wall and opens outwardly through the circular periphery of flange 12. A projectile-driving piston 32 is disposed in each bore 30, each piston 32 including at its inner end an enlarged cylindrical head 33 which slidably engages the wall of bore 30 and is equipped with an O-ring 34 to seal against escape of combustion gases outwardly through bore 30. Each piston 32 is somewhat longer than the bore 30 which accommodates it, so that the outer end portion 35 of the piston projects from the open outer end of bore 30 when the piston is in its innermost or initial position.

The circular periphery of flange 12 is embraced by a cooperating pair of semicircular half-rings 36 which engage the periphery of the flange in flush engagement. Half-rings 36 are provided with a plurality of circular openings 37 equal in number to bores 30 and spaced apart equally in such fashion as to be each aligned with a different one of bores 30, the outer end portions 35 of the pistons then each projecting outwardly through a different one of openings 37. An O-ring 38 surrounds the shank of each piston 32, providing a seal between the mouth of bore 30, the piston, and half-ring 36.

In addition to accommodating bores 30, flange 12 serves to position a plurality of projectiles 39 which are attached to skirt 1' of canopy 1. Each projectile 39 is generally U-shaped, having a base portion 40 and leg portions 41 and 42. The inner face of base portion 40 engages the outer surface of half-ring 36 and is provided with a cylindrical recess 43 of such size as to accommodate the projecting tip portion 35 of one of the pistons 32. The inner face 44 of leg 41 extends in flush engagement with the face 45 of flange 12 which is directed toward initiator 17. Inner face 46 of the projectile slants inwardly and away from the face 47 of flange 12 which is directed toward eye-bolt 14. The side faces 48 of each projectile 39 converge inwardly, each lying in a plane which contains the central axis of the gun, the projectiles being in side-to-side contact when all of the projectiles are assembled on flange 12 in the complete annular series seen in FIGS. 3 and 4.

The outer face 49 of leg 41 of each projectile is provided with an arcuate groove 50 adjacent the tip of leg 41, the arrangement of grooves 50 being such that, when all of the projectiles are properly in place on flange 12, the individual grooves 50 cooperate to define a continuous circular groove which is centered on the longitudinal axis of portion 11 and opens toward the initiator 17. Each arcuate groove 50 has an outer wall 51 in the form of part of a right cylindrical surface, and an inner wall including a cylindrical portion 52 and a portion 53 which is in the form of part of a frusto-conical surface slanting from the bottom of the groove inwardly and toward initiator 17.

The portion of central body portion 11 between flange 12 and initiator 17 has a smooth cylindrical outer surface 54 which is slidably embraced by the cylindrical body 55 of a projectile restraining device indicated generally at 56. Device 56 includes an outwardly projecting transverse annular flange 57 and a peripheral flange 58 which is cylindrical and concentric with body 55, body 55 and flanges 57 and 58 being integral. Flange 58 is provided with an annular slot 59 opening toward flange 12. A circular shear band 60 is secured in slot 59, as by a force fit, and projects from the tip of flange 58 toward flange 12. The dimensions of slot 59 and shear band 60 are such that, when device 56 is moved along surface 54 toward flange 12, and the projectiles 39 are all properly assembled on and positioned by flange 12, the shear band enters into the circular groove defined by the individual arcuate grooves 50 in the projectiles. The main portion of shear band 60 is cylindrical and the free edge 61 thereof is bent outwardly so as to be frusto-conical, with the angle and direction of its inclination matching the angle and direction of the wall portions 53 of grooves 50 when the projectiles are properly assembled on flange 12. The effective axial length of the projecting portion of the shear band is such that, when the end surface 62 of flange 58 engages faces 49 presented by projectiles 39, the free edge portion 61 of the shear band is in face-to-face engagement with wall portions 53 of grooves 50.

Device 56 can thus be considered as having a first position on surface 54 determined by engagement of end surface 62 with faces 49 when the projectiles are properly assembled on flange 12. With the projectiles thus assembled, and with device 56 in its first position, engagement of shear band 60 in grooves 50 is effective to lock the projectiles securely on flange 12, against outwardly acting forces of normal small magnitude as compared to the driving forces applied to the projectiles by pistons 32 when charge 15 is fired. A second position for device 56 is determined by a snap ring 63 which is engaged in a suitable groove in central body 11 at the end of surface 54 adjacent initiator 17. Movement of device 56 along surface 54 from the first position of the restraining device (FIG. 2) toward the end of the gun occupied by the initiator is effective to bring the restraining device to its second position, determined by engagement of portion 55 with ring 63 (FIG. 5). With device 56 in its second position, shear band 60 is fully withdrawn from slots 50, so that the projectiles 39 are now free to be removed from flange 12.

When the parachute apparatus is packed, firing lanyard 7 is stowed in the tubular compartments of a flexible container 65, the container being bent in a circle to surround the initiator 17, as will be clear from FIGS. 2 and 4. Container 65 is initially secured to the spreading gun by cords 66 which are looped through apertures in the ends of pins 67, one of the cords 66 being a break cord. Pins 67 are secured to flange 12 and extend freely through openings in flange 57 of device 56, the pins 67 being parallel with the central body portion 11 of the spreading gun so as not to impede movement of device 56. It will be understood that, as the drogue canopies 4 and 5 act to extract and deploy canopy 1, so that the firing lanyard 7 pays out, the break cord 66 ruptures under the deployment force so that the container 65 can spread to a flat condition and the firing lanyard can be withdrawn from the compartments of container 65, the firing lanyard ultimately straightening and becoming taut, as shown in FIG. 1, as deployment of the canopy 1 is completed.

In order to secure the restraining device 56 in its first position against forces of shock and vibration which may be encountered prior to actuation of the spreading gun, one of the pins 67 is provided with a shear wire 67' disposed on the side of flange 57 directed toward the initiator.

Member 68 constitutes means for moving device 56 from its first position toward its second position as the pin 21 is moved to cause striker 22 to fire the gun 6. The adjacent end of portion 55 of device 56 has a transverse annular outwardly projecting flange 55' which is surrounded by the free end of the cylindrical wall of member 68. The free end of the cylindrical wall of member 68 is equipped with a plurality of circularly spaced inwardly projecting screws or pins 69 disposed between flange 55' and flange 57. When firing pin 21 and member 68 are in their initial position, with the end wall of member 68 held against end wall 20 of casing 18 by spring 26, screws 69 are spaced from flange 55' toward flange 57, so that enough relative movement between firing pin 21 and casing 18 to fire primer 16 can occur before screws 69 engage flange 55' and move device 56. Continued relative movement between pin 21 and casing 18 causes screws 69 to move device 56 to the left, as viewed, until flange 55' engages ring 63 and shear band 60 is completely withdrawn from groove 50.

Relative movement between firing pin 21 and housing 10 (and therefore casing 18) commences as soon as firing lanyard 7 becomes taut between the firing pin and load 3 as main canopy 1 is deployed. Drogue canopy 5 exerts a continuing strain on housing 10 and the resulting relative axial movement between pin 21 and casing 18 continues, with compression of spring 26. Being held in engagement in groove 25 by reason of their rolling contact with the inner wall of casing 18, balls 24 keep striker 22 secured to the firing pin. When balls 24 reach groove 27, they are cammed outwardly, freeing the striker from the firing pin. Spring 26 then accelerates striker 22 to the right as viewed in FIG. 5, so that the striker impacts the primer 16, causing charge 15 to be fired in conventional fashion.

Line 8 remains taut, and relative movement between housing 10 and pin 21 therefore continues, so that the firing pin is progressively withdrawn from the initiator. At the instant striker 22 is freed from the firing pin and actuated by spring 26 to fire the charge 15, the shear band 60 remains engaged in grooves 50. Accordingly, the shear band acts to restrain projectiles 39 until the expanding combustion gases produced by charge 15 produces forces on pistons 32 adequate to cause the shear band to be ruptured so the projectiles 39 can then be driven radially outwardly from the gun. The relative movement between housing 10 and pin 21 resulting from the action of the drogue canopy continues, regardless of success or failure of the firing of charge 15. Accordingly, at a very short time subsequent to release of striker 22, device 56, under the influence of member 68, reaches its second position, as seen in FIG. 5, so that the shear band has been moved by a distance adequate to assure its complete disengagement from grooves 50. If charge 15 has been successfully fired, such withdrawal of the shear band has no practical effect, since successful firing of the charge will have resulted in shearing of band 60 in any event. However, should the charge not have been successfully ignited, the withdrawal of the shear band serves to free the projectiles 39 from the gun.

As seen in FIG. 2, charge 15 is disposed within a cartridge made of synthetic resin or like material, there being a thin anti-corrosion sleeve 70 interposed between the cartridge and the inner wall of body portion 11. Sleeve 70 is provided with a plurality of apertures 71 arranged in a transversely extending circular series so that each aperture 71 can be aligned with a different one of the ports 31. The wall of the cartridge enclosing charge 15 is thinned in the area occupied by apertures 71, so that, upon ignition of the charge, the increasing gas pressure bursts the cartridge wall at each aperture 71 and the combustion gases are released into ports 31 and bores 30. The pressures thus established in bores 30 accelerate pistons 32 outwardly until piston heads 33 engage halfrings 36, the latter being secured to the flange 12 in any suitable fashion and serving to stop the outward travel of the driving pistons. Accordingly, though the pistons 32 act to drive the projectiles 39 radially outwardly at a desired high rate, the pistons themselves do not escape from the gun, and the combustion gases from charge 15 are confined within bores 30 so as not to contact and burn the canopy.

Each projectile 39 is cut away at 72 to provide two ears 73, and a pin 74 is secured in suitable aligned bores in ears 73. A tape or ribbon 75 is provided for each projectile, extending through the space between ears 73 and being looped around pin 74, the ends of the tape or ribbon being sewed or otherwise attached to skirt 1' at one of the suspension lines 2. Accordingly, each projectile is securely attached to skirt 1' in such fashion that, when the gun 6 is fully assembled and ready for firing, the points on the skirt 1' to which the suspension lines are attached are held close to the gun, the portions of skirt 1' between adjacent suspension lines billowing outwardly as indicated at 1'', FIG. 1, and allowing entry of air into the space within the canopy.

Two of the projectiles 39 are of modified configuration to accommodate two pins 76, FIGS. 2 and 5, which retain the anti-squidding lines 9. In each of these two projectiles, leg 42 is provided with a slot 77 which opens toward the free end of the leg and is of a width to allow free passage of one of the pins 76 therethrough. At two points spaced apart by 180°, flange 12 has through bores 78 to receive the tip portions of pins 76, each bore 78 being between an adjacent pair of the cylinder bores 30 and extending parallel to the longitudinal axis of the gun. Adjacent each bore 78, flange 12 is provided with an outwardly opening bore 79 which extends parallel to one of the adjacent bores 30 and intersects the respective bore 78. Each bore 79 is of smaller diameter than the bore 78 which it intersects, and is disposed with its axis offset laterally from the axis of the bore 78, as will be clear from FIG. 5.

Two of the pistons 32 are modified in the manner seen in FIG. 8, so as to include a transverse disc 80 secured to the tip of the shank of the piston, and a retaining pin 81 fixedly carried by disc 80 and extending parallel to the piston shank. The space between the piston shank and the pin 81 is such that, when the piston is properly inserted in the appropriate cylinder bore 30, the pin 81 can be inserted into the adjacent bore 79 and will project inwardly across the respective bore 78, as seen in FIG. 7, when the piston is fully inserted.

Each pin 76 has a portion of reduced diameter which provides shoulders 82. During assembly, the pins 76 are inserted in bores 78 before the corresponding pistons, equipped with pins 81, are installed. During assembly, pins 76 are positioned so that, as the pins 81 enter fully into bores 79 each pin 81 will extend between shoulders 82 of the respective pin 76 so that the pin 76 will be held against withdrawal from its bore 78 until, upon firing of the gun, the piston 30 travels outwardly far enough to disengage pin 81 from between shoulders 82. At its other end, each pin 76 is provided with a ring 83 to which the end of one of the anti-squidding lines 9 is attached. It will thus be clear that, so long as the gun 6 remains properly assembled and has not been fired, pins 76 will remain locked to the gun and the anti-squidding lines 9 thus will remain effective so that, assuming canopy 1 to have been properly extracted and subject to an adequate relative wind, the anti-squidding lines will cause the canopy to assume a configuration, such as that seen in FIG. 1, such that the force $F_r$ tends to spread the canopy and will thus aid the spreading gun. Similarly, if the gun 6 should not fire successfully, the anti-squidding lines are still effective, and the force $F_r$ aids the aerodynamic spreading of the canopy which occurs after device 56 has been withdrawn to disengage shear band 60 from the grooves 50.

The parachute apparatus can typically be used in conjunction with a conventional aircraft ejection seat (not shown), with the smaller drogue canopy 4 being released automatically for aerodynamic deployment and serving to initially stabilize the attitude of the seat and to extract the larger drogue canopy 5 which in turn extracts the main canopy 1. In such applications, the load 3 is the occupant of the ejection seat. Ejection of the seat, and operation of the parachute apparatus, may occur when the air speed of the aircraft is relatively low, or when the air speed is high. When the air speed is low, the rate at which the canopy 1 tends to stream from the configuration of FIG. 1 toward the squidded configuration of FIG. 1A, after release of the anti-squidding lines 9, is relatively low, so that the force $F_r$, FIG. 1, can aid the spreading action of gun 6 even though the anti-squidding lines have been released. Thus, at a low air speed, the time required for canopy 1 to stream to the configuration seen in FIG. 1A may be large as compared to the total time between action of striker 22 and successful projection of projectiles 39. Thus, at low air speeds, gun 6 can spread canopy 1 very quickly. Though such rapid spreading tends to cause an increased snatch force, applied to the load by the spread canopy, the snatch force will not be unduly large because of the low air speed.

In instances where the air speed is high, however, it is desirable to damp the action of the spreading gun. Such damping results automatically, at high air speeds, because the canopy 1 tends to stream very quickly from the FIG. 1 configuration to the FIG. 1A configuration once the anti-squidding lines 9 are released. Thus, at high air speeds, the force $F_r$ can reverse, from a direction aiding the spreading gun (FIG. 1) to a direction opposing or damping the spreading gun, within a time so short that the projectiles 39 have travelled only a relatively small distance outwardly. Accordingly, with the initially-retained, then released lines 9, the operation of the spreading gun 6 is automatically damped when the parachute is deployed under high air speed conditions and this damping action increases as the air speed increases, so that the magnitude of the snatch force applied to the load as a result of spreading of the canopy is satisfactorily limited.

Comparing FIGS. 2 and 5, it will be noted that member 68 is held against further movement to the left, as viewed, once flange 55' has been brought into engagement with ring 63. It will be understood that firing of gun 6 occurs while drogue 5 is aerodynamically effective. Hence, with member 68 held against further movement, the combination of housing 10, screws 69, member 68 and pin 21 constitutes a rigid connection between drogue line 8 and firing lanyard 7 so that, as main canopy 1 is spread, the gun 6 is restrained to an approximately centered position relative to the canopy, so that there is no possibility that the gun will "whip" and damage canopy 1. As the main canopy becomes fully spread and load 3 is suspended therefrom, line 8 can pass downwardly through the opening in the apex of the main canopy until drogue canopy 5 reaches the main canopy, and the spreading gun then is suspended from the main canopy by the combination of line 8 and drogue canopy 5.

Attention is called to copending application Serial No. 439,568, filed concurrently herewith by Fred B. Stencel, Thomas M. Britton, Jr., Walter R. Peck, Robert J. Manzuk and James W. Duncan, and directed to the fail-safe ballistic spreading gun hereinbefore described.

Though one particularly advantageous illustrative embodiment of the invention has been shown and described, it will be understood by those skilled in the art that various changes and modifications can be made therein without departing from the scope of the invention as defined in the appended claims.

What is claimed is:

1. In a parachute apparatus capable of successful operation at both high relative air speeds and low relative air speeds, the combiantion of a parachute canopy having a skirt and an apex;

a ballastic spreading device comprising projectile means connected to the skirt of said canopy and adapted to be projected laterally from said spreading device to effect positive spreading of said canopy; and power means for projecting said projectile means;

suspension means connected to the skirt of said canopy and adapted to be connected to the load to be recovered by the parachute apparatus;

at least one anti-squidding line having one end connected to said canopy; and releasable means connected to the other end of said anti-squidding line, said releasable means being initially secured to said spreading device for release therefrom upon projection of said projectile means;

said anti-squidding line being substantially shorter than the length of said canopy when said canopy is in fully streamed-out condition, said anti-squidding line acting to prevent said canopy from streaming prior to projection of said projectile means, release of said anti-squidding lines upon projection of said projectile means allowing said canopy to stream while said projectile means is in projected flight.

2. Parachute apparatus according to claim 1 and further comprising an aerodynamic drogue;

a drogue line interconnecting said drogue and said spreading device and extending freely through the apex of said canopy;

an actuating line having one end attached to said spreading device and the other end adapted to be attached to the load to be recovered, said spreading device including a movable actuator to which said actuating line is connected, said actuator being moved to actuate said spreading device when the combination of said drogue line and said actuating line first become taut under the influence of said drogue, and means preventing further relative movement between said spreading device and said actuating line once said actuator has been moved to actuate said spreading device, said spreading device being held free of said canopy by the combination of said drogue line and said actuating line, under the influence of said drogue, as said canopy is spread.

3. In a parachute apparatus capable of successful operation at both high relative air speeds and low relative air speeds, the combination of a parachute canopy having a skirt and an apex;

suspension means connected to said skirt and adapted to be connected to the load to be recovered by the parachute;

a ballistic spreading gun comprising a housing, a plurality of projectiles supported on said housing for projection laterally therefrom, each of said projectiles being connected to said skirt, power means for projecting said projectiles, and actuating means for actuating said power means;

at least one anti-squidding line having one end attached to said apex of said canopy; and releasable means attaching the other end of said anti-squidding line to said housing and operative to release said anti-squidding line substantially simultaneously with commencement of the projected flight of said projectiles, release of said anti-squidding line freeing said canopy to stream while said projectiles are in their projected flight.

4. In a parachute apparatus capable of successful operation at both high relative air speeds and low relative air speeds, the combination of a parachute canopy having a skirt and an apex;

suspension means connected to said skirt and connectable to the load to be suspended from said canopy;

a ballistic spreading gun comprising a housing, a plurality of projectiles attached to said skirt and supported by said housing for projection laterally therefrom, a plurality of driving pistons operatively carried by said housing for movement outwardly from a first position to project said projectiles, and power means for simultaneously accelerating all of said pistons outwardly from said first position;

an anti-squidding line connected at one end to said apex; and releasable means connecting the other end of said anti-squidding line to said spreading gun to prevent said canopy from streaming prior to firing of said gun, said releasable means being operatively connected with one of said driving pistons so as to be released, freeing said anti-squidding line, upon outward movement of said piston.

5. In a parachute apparatus capable of operation at both high relative air speeds and low relative air speeds, the combination of a parachute canopy having a skirt and an apex;

suspension means connected to said skirt and connectable to the load to be suspended from said canopy;

a ballistic spreading gun comprising a housing, a plurality of projectiles connected to said skirt and supported by said housing for projecting laterally therefrom to spread said canopy, power means for projecting said projectiles, and a movable actuator for actuating said power means;

an aerodynamic drogue;

drogue line means interconnecting said drogue and said housing and extending freely through the apex of said canopy;

firing line means connected to said gun and connectable to the load to be suspended from said canopy, the combination of said drogue line means and said firing line means being operative, when made taut under the influence of said drogue, to operate said actuator for actuating said power means, said firing line means and said gun including coacting retaining elements effective to maintain said firing line means attached to said gun after operation of said actuator, whereby said gun is maintained in a position substantially centered relative to said canopy as said canopy is spread by said projectiles;

at least one anti-squidding line attached at one end to said apex; and releasable connector means connecting the other end of said anti-squidding line to said gun and operative to release, freeing said anti-squidding line from said gun and thereby allowing said canopy to stream, when said gun is fired to spread said canopy.

6. In a parachute apparatus capable of operation at both high relative air speeds and low relative air speeds, the combination of a parachute canopy having a skirt and an apex;

a ballistic spreading gun comprising a housing, a plurality of projectiles connected to said skirt and carried by said housing for projection therefrom to effect positive spreading of said canopy, and power means for projecting said projectiles;

anti-squidding line means having one end connected to said canopy at at least one point remote from said skirt; and releasable means connecting the other end of said anti-squidding line means to said gun and operative to release said anti-squidding line means upon firing of said gun.

References Cited by the Examiner

UNITED STATES PATENTS 3,010,685   11/1961   Stencel _____ 244—147

MILTON BUCHLER, *Primary Examiner.*

A. E. CORRIGAN, *Assistant Examiner.*